United States Patent
Parker et al.

(10) Patent No.: US 10,662,806 B2
(45) Date of Patent: May 26, 2020

(54) COMPRESSOR, TURBINE AND TURBOCHARGER

(71) Applicant: Cummins Turbo Technologies Limited, Huddersfield (GB)

(72) Inventors: John Frederick Parker, Huddersfield (GB); Owen Alistair Ryder, West Yorkshire (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 778 days.

(21) Appl. No.: 14/942,359

(22) Filed: Nov. 16, 2015

(65) Prior Publication Data

US 2016/0069208 A1 Mar. 10, 2016

Related U.S. Application Data (63) Continuation of application No. 12/842,479, filed on Jul. 23, 2010, now Pat. No. 9,200,567.

(30) Foreign Application Priority Data

Jul. 23, 2009 (GB) .................................. 0912796.0

(51) Int. Cl.
*F01D 21/04* (2006.01)
*F01D 25/24* (2006.01)
(Continued)

(52) U.S. Cl.
CPC ........... *F01D 21/045* (2013.01); *F01D 25/24* (2013.01); *F02C 6/12* (2013.01); *F04D 29/4206* (2013.01); *F05B 2220/40* (2013.01)

(58) Field of Classification Search
CPC .... F01D 21/045; F01D 25/24; F04D 29/4206; F02C 6/12; F05B 2220/40; F05D 2220/40
(Continued)

(56) References Cited

U.S. PATENT DOCUMENTS 2,925,952 A 2/1960 Garve
3,362,629 A 1/1968 Papapanu
(Continued)

FOREIGN PATENT DOCUMENTS

DE 4223496 1/1994
EP 0716218 6/1996
(Continued)

OTHER PUBLICATIONS

United Kingdom Search Report, GB0912796.0 Cummins Turbo Technologies Limited, dated Oct. 26, 2009.
Machine translation of EP 1586 745, Oct. 2005.

*Primary Examiner* — Christopher Verdier
(74) *Attorney, Agent, or Firm* — Taft Stettinius & Hollister LLP (57) ABSTRACT

A compressor for compressing a gas, the compressor comprising: a housing having an axial inlet and an annular outlet volute; an impeller wheel including a plurality of blades, the wheel being rotatably mounted within the housing between the inlet and outlet volute; the axial inlet being defined by a tubular inducer portion of the housing and the annular outlet volute being defined by an annular diffuser passage surrounding the impeller, the diffuser having an annular outlet communicating with the outlet volute; the housing having an inner wall defining a surface located in close proximity to radially outer edges of the impeller blades which sweep across the surface as the impeller wheel rotates; wherein the compressor housing incorporates at least one section comprised of a deformable, energy absorbing material arranged to deform and absorb energy generated as a result of impeller wheel failure. A turbine incorporating similar deformable, energy absorbing materials is also described, as are turbochargers incorporating such a compressor and/or turbine.

14 Claims, 4 Drawing Sheets

(51) Int. Cl.
*F02C 6/12* (2006.01)
*F04D 29/42* (2006.01)

(58) Field of Classification Search
USPC .... 415/9, 173.1, 173.3, 173.4, 174.2, 174.4, 415/196, 197, 200, 203–206, 172.1; 60/602; 417/407
See application file for complete search history.

(56) References Cited

U.S. PATENT DOCUMENTS

| | | |
|---|---|---|
| 4,411,592 A | 10/1983 | Traver et al. |
| 4,504,188 A | 3/1985 | Traver et al. |
| 5,785,493 A | 7/1998 | Ojima et al. |
| 5,868,552 A | 2/1999 | McKean et al. |
| 5,975,845 A | 11/1999 | Ball |
| 6,193,463 B1 | 2/2001 | Adeff et al. |
| 6,264,424 B1 | 7/2001 | Fuller |
| 9,200,567 B2 * | 12/2015 | Parker .................. F01D 21/045 |
| 2002/0114693 A1 | 8/2002 | Bartholoma et al. |
| 2003/0185685 A1 | 10/2003 | Simon |
| 2006/0285972 A1 | 12/2006 | Nicoll et al. |
| 2008/0014077 A1 | 1/2008 | Hopkins |
| 2008/0118355 A1 | 5/2008 | Buttner et al. |
| 2008/0241527 A1 * | 10/2008 | De Iaco ................ B05D 5/083 428/339 |
| 2008/0304953 A1 | 12/2008 | Chen et al. |

FOREIGN PATENT DOCUMENTS

| | | |
|---|---|---|
| EP | 1013890 | 6/2000 |
| EP | 1586745 | 10/2005 |
| EP | 1707745 | 10/2006 |
| EP | 2000633 | 12/2008 |
| GB | 2420314 | 5/2006 |
| GB | 2447036 | 9/2008 |
| WO | 9619640 | 6/1996 |
| WO | 2007031279 | 3/2007 |
| WO | 2008036862 | 3/2008 |

* cited by examiner

Figure 1

--Prior Art--

COMPRESSOR, TURBINE AND TURBOCHARGER

CROSS-REFERENCE TO RELATED APPLICATIONS

The present application is a divisional of U.S. patent application Ser. No. 12/842,479 filed on Jul. 23, 2010, now issued as U.S. Pat. No. 9,200,567 on Dec. 1, 2015, which claims priority to United Kingdom Patent Application No. 0912796.0 filed Jul. 23, 2009 each of which is incorporated herein by reference in its entirety for all purposes.

The present invention relates to a compressor, particularly but not exclusively, a compressor for use in a turbocharger, such as a variable geometry turbocharger. The present invention also relates to turbines suitable for, but not limited to, use in turbochargers and variable geometry turbochargers.

A compressor comprises an impeller wheel, carrying a plurality of blades (or vanes) mounted on a shaft for rotation within a compressor housing. Rotation of the impeller wheel causes gas (e.g. air) to be drawn into the impeller wheel and delivered to an outlet chamber or passage. In the case of a centrifugal compressor the outlet passage is in the form of a volute defined by the compressor housing around the impeller wheel and in the case of an axial compressor the gas is discharged axially.

Turbochargers are well known devices for supplying air to the intake of an internal combustion engine at pressures above atmospheric pressure (boost pressures). A conventional turbocharger essentially comprises a housing in which is provided an exhaust gas driven turbine wheel mounted on a rotatable shaft connected downstream of an engine outlet manifold. A compressor impeller wheel is mounted on the opposite end of the shaft such that rotation of the turbine wheel drives rotation of the impeller wheel. In this application of a compressor, the impeller wheel delivers compressed air to the engine intake manifold. The turbocharger shaft is conventionally supported by journal and thrust bearings, including appropriate lubricating systems.

In known turbochargers, the turbine stage comprises a turbine chamber within which the turbine wheel is mounted; an annular inlet passage defined between facing radial walls arranged around the turbine chamber; an inlet arranged around the inlet passage; and an outlet passage extending from the turbine chamber. The passages and chambers communicate such that pressurised exhaust emissions, including gaseous and particulate species, admitted to the inlet chamber flow through the inlet passage to the outlet passage via the turbine and rotate the turbine wheel. It is also known to improve turbine performance by providing vanes, referred to as nozzle vanes, in the inlet passage so as to deflect gas flowing through the inlet passage towards the direction of rotation of the turbine wheel. Turbines may be of a fixed or variable geometry type. Variable geometry turbines differ from fixed geometry turbines in that the size of the inlet passage can be varied to optimise gas flow velocities over a range of mass flow rates so that the power output of the turbine can be varied to suite varying engine demands. For instance, when the volume of exhaust gas being delivered to the turbine is relatively low, the velocity of the gas reaching the turbine wheel is maintained at a level which ensures efficient turbine operation by reducing the size of the annular inlet passage.

As the level of performance required from turbochargers has increased, so too have the technical requirements placed on turbocharger components. One approach to improving performance has been to introduce titanium or steel compressor impeller wheels. An important property of the compressor housing within which the impeller wheel is mounted is that it is sufficiently strong to contain debris generated as a result of impeller wheel failure. As impeller wheels have become heavier, stronger and operated at higher speeds it has therefore become necessary to increase the strength of the compressor housing. To date, this increased strength has been achieved by using stronger but heavier materials which require stronger means of attachment to the adjacent bearing housing. It will be appreciated that similar factors also apply to turbine housings. As a result the cost and complexity of turbocharger manufacture has increased to provide the desired increases in performance.

It is an object of the present invention to obviate or mitigate one or more of the problems set out above.

According to a first aspect of the present invention there is provided a compressor for compressing a gas, the compressor comprising:

a housing having an axial inlet and an annular outlet volute;

an impeller wheel including a plurality of blades, the wheel being rotatably mounted within the housing between said inlet and outlet volute;

the axial inlet being defined by a tubular inducer portion of the housing and the annular outlet volute being defined by an annular diffuser passage surrounding the impeller, the diffuser having an annular outlet communicating with the outlet volute;

the housing having an inner wall defining a surface located in close proximity to radially outer edges of the impeller blades which sweep across said surface as the impeller wheel rotates;

wherein the compressor housing incorporates at least one section comprised of a deformable, energy absorbing material arranged to deform and absorb energy generated as a result of impeller wheel failure during use.

As a result of forming at least a section of the compressor housing from a deformable, energy absorbing material the containment properties of the compressor housing can be significantly increased compared to conventional housings. As well as affording significant safety benefits, it will also be appreciated that this modification to existing compressor housings enables the remainder of the compressor housing (when the housing is not made entirely from energy absorbing material) to be less strong and therefore potentially lighter and/or cheaper. This reduction in weight has the additional benefit of reducing the strength of the means of attachment required between the compressor housing and bearing housing when the compressor is employed in a turbocharger, which thereby further reduces the cost and complexity of manufacturing a turbocharger incorporating such a compressor.

In a first preferred embodiment the deformable, energy absorbing material may form at least part of the inner wall of the compressor housing which defines the surface across which the impeller blades sweep as the impeller wheel rotates during use. This preferred embodiment of the present invention is designed to afford greater protection against impeller wheel failure in the region or regions of the compressor housing which are most likely to be impinged first by debris flung radially outwards from the impeller wheel upon failure during use. Deformable, energy absorbing material may be embedded within the inner wall of the compressor housing at a location adjacent to said surface. Alternatively or additionally deformable, energy absorbing material may be embedded within the inner wall at a location spaced axially and/or radially outboard of said surface.

Preferably, the deformable, energy absorbing material forms at least part of the surface across which the impeller blades sweep as the impeller wheel rotates during use. The deformable, energy absorbing material may form substantially all of said surface.

In a second preferred embodiment, which may optionally be combined with the first embodiment, deformable, energy absorbing material may be comprised in a region of the compressor housing adjacent to the inner wall which defines the surface across which the impeller blades sweep as the impeller wheel rotates during use.

In a third preferred embodiment, which may optionally be combined with the first and/or second embodiment, deformable, energy absorbing material may form at least part of the axial inlet and/or annular outlet volute of the compressor housing.

In a fourth preferred embodiment, which may be combined with one or more of the first, second and third embodiments, deformable, energy absorbing material may form at least part of the tubular inducer portion of the compressor housing and/or at least part of the annular diffuser passage of the compressor housing.

The annular diffuser passage is preferably at least partly defined by a diffuser plate located axially inboard of the impeller wheel and it is preferred that the diffuser plate comprises deformable, energy absorbing material. The diffuser plate may be formed from said deformable, energy absorbing material provided with an outer coating of a suitable coating material, such as aluminium metal or an aluminium alloy.

According to a second aspect of the present invention there is provided a turbine comprising:
 a housing;
 a turbine wheel supported within said housing for rotation about a turbine axis;
 an annular inlet passage within said housing upstream of said turbine wheel and defined between respective radial inlet surfaces of first and second wall members;
 an axial outlet passage within said housing downstream of said turbine wheel;
 wherein the turbine housing incorporates at least one section comprised of a deformable, energy absorbing material arranged to deform and absorb energy generated as a result of turbine wheel failure.

The deformable, energy absorbing material may form at least part of the turbine housing which defines the annular inlet passage and/or axial outlet passage of the turbine.

According to a third aspect of the present invention there is provided a turbocharger comprising a compressor according to the first aspect and/or a turbine according to the second aspect of the present invention.

According to a fourth aspect of the present invention there is provided a turbocharger comprising:
 a turbocharger shaft rotatable about an axis;
 a turbine comprising a turbine wheel provided at one end of the shaft for rotation about said axis within a turbine housing;
 a compressor comprising an impeller wheel mounted to the other end of the shaft for rotation about said axis within a compressor housing;
 the shaft being rotatable on at least one bearing assembly housed within a bearing housing located between the compressor housing and the turbine housing;
 wherein the compressor housing and/or turbine housing incorporates at least one section comprised of a deformable, energy absorbing material arranged to deform and absorb energy generated as a result of the failure of the impeller wheel and/or turbine wheel respectively.

Preferably the compressor is in accordance with the first aspect of the present invention and/or the turbine is in accordance with the second aspect of the present invention.

A fifth aspect of the present invention provides a variable geometry turbocharger comprising a turbocharger according to the third or fourth aspects of the present invention.

It is particularly preferred that the deformable, energy absorbing material comprises a cellular material.

The deformable, energy absorbing material may comprise an open or closed pore material.

Preferably the deformable, energy absorbing material comprises a metal foam and/or metal mesh.

The deformable, energy absorbing material may comprise at least one metal or metal alloy wherein the metal is selected from the group consisting of aluminium, titanium, magnesium, iron, steel, nickel and copper. The deformable, energy absorbing material may comprise a composite of two or more metals and/or metal alloys, for example steel reinforced aluminium.

Optionally, the deformable, energy absorbing material may incorporate one or more polymeric and/or ceramic materials.

It is preferred that the deformable, energy absorbing material is a foam having a density of up to around 50% of the density of a corresponding solid material (i.e. the same material from which the foam is formed but in a solid, non-porous form). More preferably the foam has a density of up to around 35%, still more preferably up to around 25%. The foam preferably has a minimum density of around 2% of a corresponding solid material, more preferably a density of at least around 5% and still more preferably a density of at least around 10%. It is particularly preferred that the foam has a density of around 3 to around 40% of a corresponding solid material, and yet more preferably a density of around 5 to 25%. Most preferably the foam has a density of around 10%, around 15% or around 20% of a corresponding solid material.

Other advantageous and preferred features of the invention will be apparent from the following description.

Specific embodiments of the present invention will now be described, by way of example only, with reference to the accompanying drawings, in which.

Figure 1:
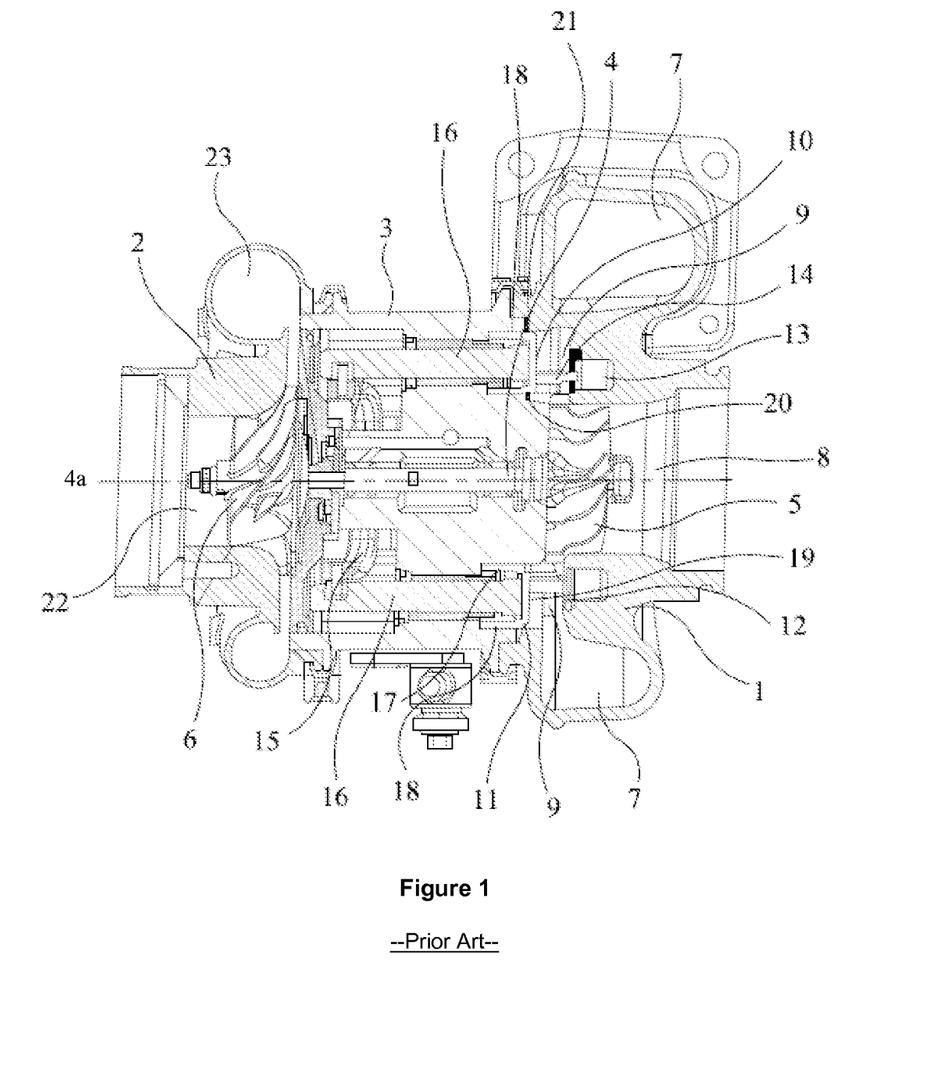
FIG. 1 is an axial cross-section through a known variable geometry turbocharger.

Referring to FIG. 1, this illustrates a known variable geometry turbocharger comprising a housing comprised of a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passage 8 via an annular inlet passage 9 and the turbine wheel 5. The inlet passage 9 is defined on one side by a face 10 of a movable annular wall member 11, commonly referred to as a "nozzle ring", and on the opposite side by an annular shroud 12 which forms the wall of the inlet passage 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passage 9. The vanes 14 are orientated to deflect gas flowing through the inlet passage 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled. The speed of the turbine wheel 5 is dependent upon the velocity of the gas passing through the annular inlet passage 9. For a fixed rate of mass of gas flowing into the inlet passage 9, the gas velocity is a function of the width of the inlet passage 9, the width being adjustable by controlling the axial position of the nozzle ring 11. FIG. 1 shows the annular inlet passage 9 fully open. The inlet passage 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passage 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

In FIGS. 2 to 10, the illustrated compressor is a centrifugal compressor 24 of the kind used in a turbocharger of the type described above in relation to FIG. 1. The compressor impeller wheel 25 has a plurality of blades 26 each having a front edge 27, which, in use, rotates within a housing inducer portion 28 of the compressor housing 29, a tip 30 which sweeps across an annular inlet 31 of a diffuser portion 32 of the compressor housing 29, and a curved edge 33 defined between the front edge 27 and the tip 30 which sweeps across a surface 34 of the housing 29 defined between the inducer 28 and the diffuser 32. The compressor housing 29 is a unitary cast structure.

Figure 2:
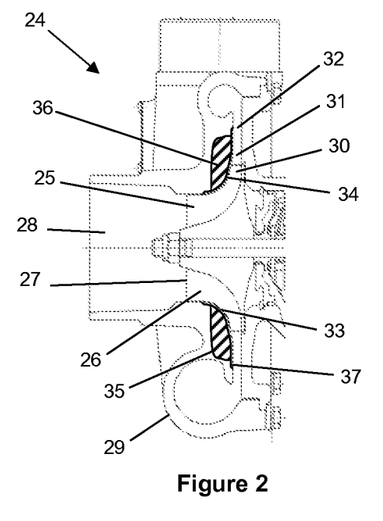
FIG. 2 is a cross-sectional drawing of the compressor stage of a turbocharger of the kind shown in FIG. 1, in which the compressor is in accordance with a first preferred embodiment of the first aspect of the present invention.

Referring in more detail to FIG. 2 which shows a first preferred embodiment of a compressor 24 according to a first aspect of the present invention, the compressor housing 29 has been cast so as to define an annular surface depression 35 within which has been mounted a ring of deformable, energy absorbing material 36 immediately behind surface 34 over which the impeller blades 26 sweep during operation. The deformable, energy absorbing ring 36 is essentially a profile insert which is retained in place by a relatively thin ring 37 whose profile is intended to match that of surface 34 in a conventional compressor and therefore necessitates no further modification to any other components within the compressor 24. Alternative methods for retaining the deformable, energy absorbing material 36 within the compressor housing 29 and exemplary materials are discussed in more detail below.

Figure 3:
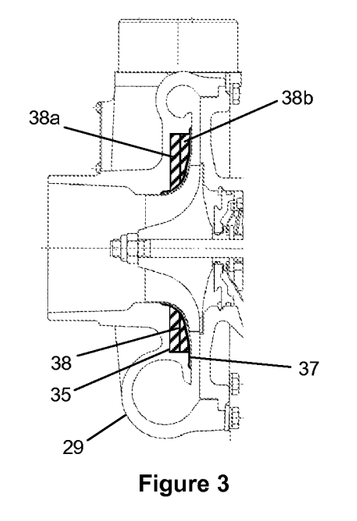
FIG. 3 is a cross-sectional drawing of the compressor stage of a turbocharger of the kind shown in FIG. 1, in which the compressor is in accordance with a second preferred embodiment of the first aspect of the present invention.

FIG. 3 shows a second preferred embodiment of a compressor according to the first aspect of the present invention wherein like parts are given the same reference numerals as FIG. 2 and the only difference resides in the deformable, energy absorbing material. In FIG. 3, rather than employing a single ring of material, the energy absorbing ring 38 is comprised of two axially adjacent rings of deformable, energy absorbing material 38a, 38b which again reside in a depression 35 cast into the bearing housing 29, with the two energy absorbing rings 38a, 38b held in place with an overlying plate 37.

Figure 4:
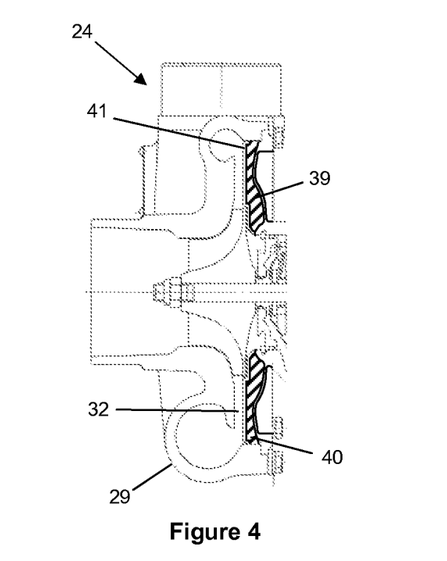
FIG. 4 is a cross-sectional drawing of the compressor stage of a turbocharger of the kind shown in FIG. 1, in which the compressor is in accordance with a third preferred embodiment of the first aspect of the present invention.

In FIG. 4, a third preferred embodiment is shown in which the section of the compressor housing 29 which is comprised of an energy absorbing material 39 is a diffuser plate 40 which in part defines the annular diffuser portion 32 of the compressor 24. In this embodiment, a significant proportion of the material which would otherwise make up the diffuser plate 40 has been replaced with deformable, energy absorbing material 39. In this embodiment, as in the first and second preferred embodiments, the energy absorbing material 39 is retained in place with an overlying plate 41 whose profile matches that of a conventional diffuser plate so as to minimise the impact of the invention on the other components of the compressor 24 and turbocharger.

Figure 5:
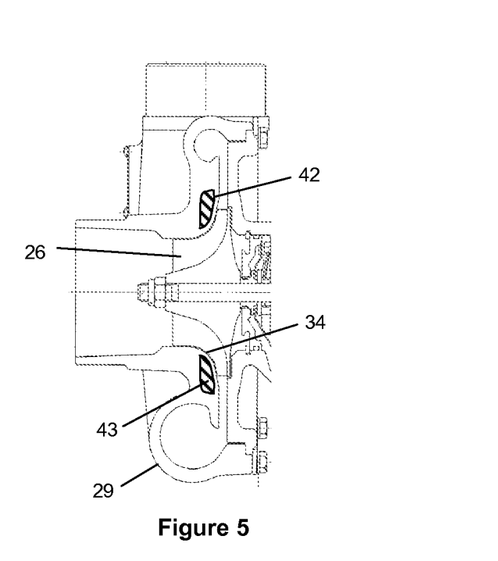
FIG. 5 is a cross-sectional drawing of the compressor stage of a turbocharger of the kind shown in FIG. 1, in which the compressor is in accordance with a fourth preferred embodiment of the first aspect of the present invention.

FIG. 5 shows a fourth preferred embodiment of the compressor according to the first aspect of the present invention. In this preferred embodiment, the compressor housing 29 has been cast so as to define an annular void 42 within its structure which is spaced both axially and radially from the surface 34 over which the impeller blades 26 sweep during operation. The void 43 is filled with deformable, energy absorbing material 43.

Figure 6:
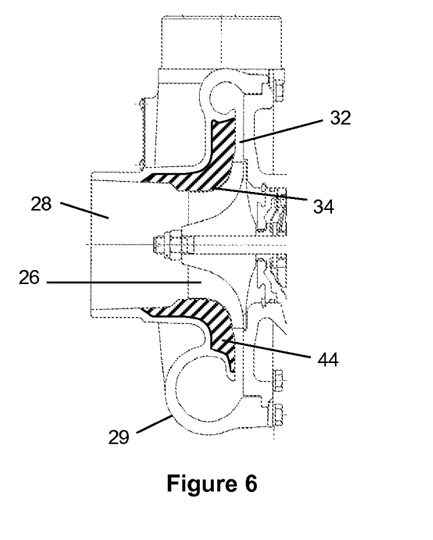
FIG. 6 is a cross-sectional drawing of the compressor stage of a turbocharger of the kind shown in FIG. 1, in which the compressor is in accordance with a fifth preferred embodiment of the first aspect of the present invention.

FIG. 6 shows a further preferred embodiment in which a significant proportion of the material which would otherwise constitute the compressor housing 29 has been replaced with deformable, energy absorbing material 44. In this embodiment, the compressor housing 29 has been cast so as to define a region extending both axially along the inducer portion 28 of the compressor housing and radially along the diffuser portion 32 of the compressor housing 29 within which is provided a complimentary shaped ring of deformable, energy absorbing material 44 so as to define an outer profile which matches that of a conventional compressor housing. In this preferred embodiment the surface 34 over which the impeller blades 26 sweep during use is formed of deformable, energy absorbing material 44. Since the energy absorbing material presents a surface over which gases will pass during operation it may be advantageous to provide that surface of the energy absorbing material 44 in the form of a closed pore material and/or higher density (lower porosity).

Figure 7:
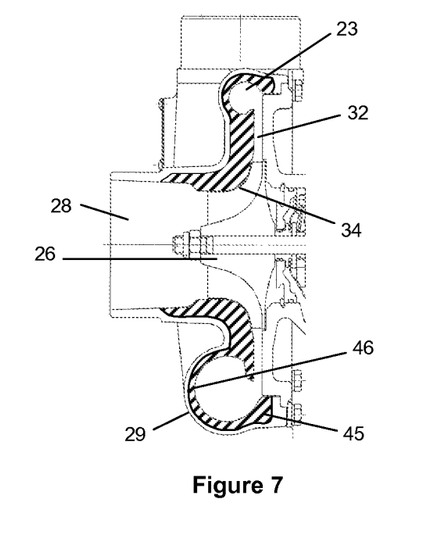
FIG. 7 is a cross-sectional drawing of the compressor stage of a turbocharger of the kind shown in FIG. 1, in which the compressor is in accordance with a sixth preferred embodiment of the first aspect of the present invention.

FIG. 7 shows another preferred embodiment in which an even greater proportion of the material which would otherwise comprise the compressor housing 29 has been replaced with deformable, energy absorbing material 45. In this embodiment, energy absorbing material 45 is provided not only in regions of the housing 29 extending axially along the compressor inducer 28 and radially along the diffuser 32 but a significant proportion of the annular outlet volute 23 is now also comprised of deformable, energy absorbing material 45. In this embodiment not only is surface 34 of the compressor housing over which blades 26 sweep during use formed of the energy absorbing material 45, but further gas handling surfaces of the compressor housing 29, for example the inner surface 46 of the annular outlet volute 23, are also formed of energy absorbing material 45. Accordingly, it is anticipated that it would be advantageous to provide at least some, if not all, of the surfaces of the energy absorbing material 45 over which gases will pass during operation of the compressor with a relatively smooth surface, for example by use of a closed pore material and/or a relatively high density (low porosity) energy absorbing material.

Figure 8:
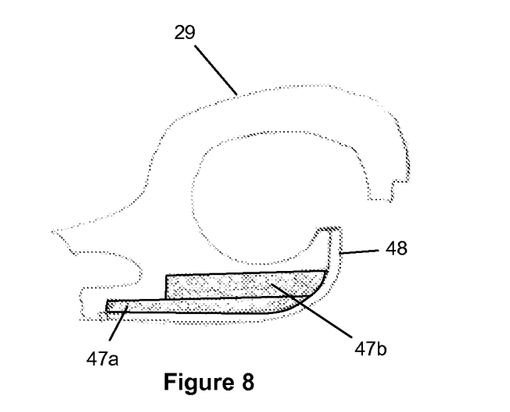
FIG. 8 is a cross-sectional drawing of the compressor stage of a turbocharger of the kind shown in FIG. 1, in which the compressor is in accordance with a seventh preferred embodiment of the first aspect of the present invention.

In FIG. 8, only a detailed section of the compressor housing 29 is shown with the other components, including the compressor impeller wheel omitted for clarity. The embodiment shown in FIG. 8 is similar to that shown in FIG. 3 insofar as the embodiment of FIG. 8 employs a pair of annular rings formed of deformable, energy absorbing material 47a, 47b retained within the compressor housing 29 by an overlying profile plate 48. In the embodiment shown in FIG. 8, however, the energy absorbing rings 47a, 47b are displaced radially with respect to one another rather than axially. That is, ring 47a is located radially inwardly compared to ring 47b. Moreover, inner ring 47a extends axially further along the compressor inducer than outer ring 47b.

Figure 9:
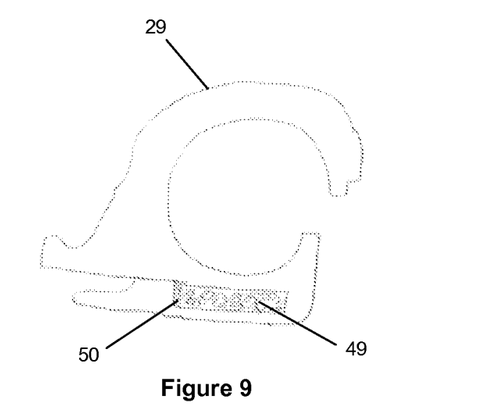
FIG. 9 is a cross-sectional drawing of the compressor stage of a turbocharger of the kind shown in FIG. 1, in which the compressor is in accordance with a eighth preferred embodiment of the first aspect of the present invention.

With respect to FIG. 9, this preferred embodiment is similar to the preferred embodiment described above in relation to FIG. 5 save for the specific location of the embedded energy absorbing ring 49. In FIG. 9, the compressor housing 29 has been cast so as to define an internal void 50 which extends axially along a length of the compressor inducer rather than radially along the diffuser portion of the compressor and in which the ring of energy absorbing material 49 has been located.

Figure 10:
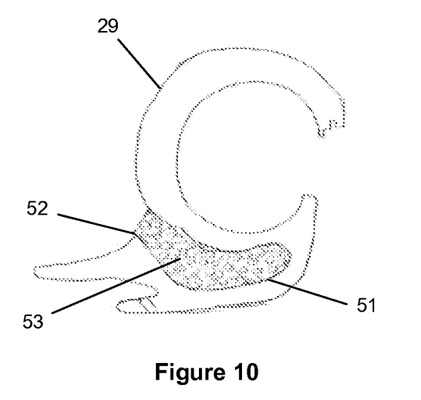
FIG. 10 is a cross-sectional drawing of the compressor stage of a turbocharger of the kind shown in FIG. 1, in which the compressor is in accordance with a ninth preferred embodiment of the first aspect of the present invention.

FIG. 10 shows a further preferred embodiment which is distinct from the preceding embodiment in that the compressor housing 29 has been cast so as to define a void 51 with an open back 52 defining an entrance to the void 51. In this way, deformable, energy absorbing material 53 can be inserted into the void 51 via the opening 52 more easily after the compressor housing 29 has been cast. In the particular embodiment shown in FIG. 10, the void 51 extends axially along the inducer and radially along the diffuser part of the compressor as well as extending outwardly towards the open back 52 of the compressor housing 29.

Figure 11:
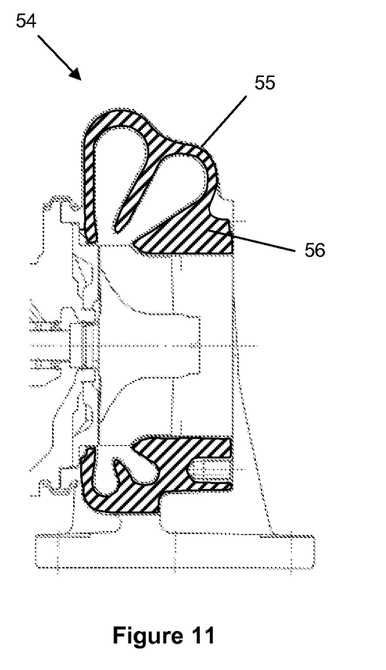
FIG. 11 is a cross-sectional drawing of a turbine stage of a turbocharger of the kind shown in FIG. 1, in which the turbine is in accordance with a first preferred embodiment of the second aspect of the present invention.

FIG. 11 is a cross-sectional view of the turbine stage 54 of a turbocharger of the kind described above in relation to FIG. 1. In FIG. 11, a substantial proportion of the turbine housing 55 has been formed from a deformable, energy absorbing material 56. In this embodiment, the turbine housing 55 has been produced so as to be essentially hollow in both the turbine inlet volute and axial outlet region of the turbine 54 and the hollow then filled with the deformable, energy absorbing material 56. In this way the energy absorbing material 56 can be shielded from the very high operating temperatures of gases flowing through the turbine.

Figure 12:
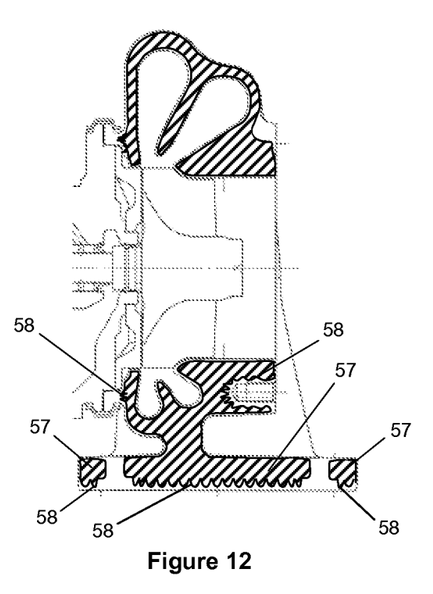
FIG. 12 is a cross-sectional drawing of a turbine stage of a turbocharger of the kind shown in FIG. 1, in which the turbine is in accordance with a second preferred embodiment of the second aspect of the present invention.

FIG. 12 depicts a similar arrangement to that shown in FIG. 11 save for two differences. First, additional regions of the turbine housing have been manufactured so as to be hollow for receipt of further deformable, energy absorbing material 57. Second, areas 58 at the boundary between the metal foam 57 and the material of the surrounding turbine housing are non-linear so as to avoid or minimise the risk of shearing at those interfacial regions. This will have the most benefit at areas of the turbine housing where stress levels are highest during and following operation of the turbine. It will be appreciated that this concept could also be employed in the compressor housing. The boundary regions may be irregular in form, or may have a more regular, repeating structure. They may be defined by surface roughening of the walls of the hollowed regions of the compressor housing into which the deformable, energy absorbing material is provided. The interfacial regions may be defined by any appropriate formation or projection, such as a series of fingers, roots or webs extending from the hollow wall surfaces. Such formations could, for example, be produced during casting of the turbine housing.

It will be appreciated that numerous modifications may be made to the preferred embodiments described above without departing from the underlying inventive concepts defined in the various aspects of the present invention. By way of example, although a large number of preferred examples have been described above, any section or sections of the compressor housing and/or turbine housing may comprise deformable, energy absorbing material to act as a "crumple zone" to absorb energy released as a result of impeller and/or turbine wheel failure during operation. Any one or more of the above described preferred embodiments could be combined with one or more of the other preferred embodiments to suit a particular application. For example, the first and third preferred embodiments could be combined such that a compressor incorporated both an annular ring of energy absorbing material immediately in front of the impeller blades (as in the first preferred embodiment) as well as a diffuser plate produced substantially from energy absorbing material (in accordance with the third preferred embodiment).

Moreover, any of the preferred embodiments incorporating energy absorbing material embedded within internal voids cast into the compressor or turbine housing (e.g. the fourth and eight embodiments) could be combined with a profile ring insert, (e.g. the first or second preferred embodiments) if desired. It will also be appreciated that a turbocharger could incorporate crumple zones in the compressor stage only, the turbine stage only or both the compressor and turbine stages. For example, a turbocharger could incorporate a compressor in accordance with any of the preferred embodiments of the first aspect of the present invention shown in FIGS. 2 to 10 and/or a turbine of the kind shown in FIG. 11 or 12.

With regard to the turbines shown in FIGS. 11 and 12, again these are presented merely by way of example only and it will be appreciated that a turbine housing could incorporate a smaller region or regions of energy absorbing material at any desired location throughout the turbine housing, e.g. just in the inlet volute region of the turbine or just in the axial outlet of the turbine.

It is envisaged that the energy absorbing material is preferably a rigid member in and of itself but which, under impact loads, would act as a crash impact component and generally deform in such a manner that the period of distortion is considerably longer than that which would be observed for a standard compressor/turbine housing in such circumstances. That is, the energy absorbing ring, rather than immediately transferring energy to the compressor/turbine housing, would absorb a significant proportion of this energy arising from impeller/turbine wheel failure and thereby lower the energy dissipation rate and protect surrounding components. By varying the density in material properties of the energy absorbing material it is envisaged that an appropriate design could be developed for each intended application which would afford the desired containment properties and reduce the weight of the compressor/turbine housing for an acceptable cost. It will be appreciated that by forming part of the compressor/turbine housing from a deformable, energy absorbing material which may be significantly lighter than the conventional material (e.g. steel) used to form that component, the remainder of the compressor/turbine housing and/or means of attachment to adjacent components may be lighter/cheaper because less strong materials may be used.

In the above described preferred embodiments a number of different ways were discussed in which the energy absorbing material could be retained. In more detail, in a first example it is envisaged that a section or sections of deformable, energy absorbing material could be cast between two plates. This is particularly applicable when using aluminium based metal foams (discussed in more detail below) which exhibit excellent adhesion to many metals that might be considered for use in a compressor/turbine housing. The deformable, energy absorbing material could be cast on to a surface leaving the opposite surface of the energy absorbing material exposed with either open or closed cells. This is again envisaged as being particularly suitable for use with metal foams which can be produced with either an open or closed pore structure. Liquid injection moulding could also be used to provide energy absorbing material within a cavity or cavities defined by or cast into the compressor/turbine housing. It is also anticipated that brazing of a block or section of energy absorbing material could be used to connect it to a surface or cavity within a compressor/turbine housing.

Other means by which the energy absorbing material may be retained are, for example, use of a polymeric adhesive, which will only be feasible in areas which experience temperatures in use which are not in excess of the melting or degradation temperature of such an adhesive. This may be particularly suitable for use in the compressor housing. Molten polymeric materials may also be used, not as an adhesive, but rather to form a physical connection between the energy absorbing material and the housing after the polymer solidifies upon cooling. Another physical means to retain energy absorbing material within a cavity in the compressor/turbine housing would be to use some form of clamp or plate to retain a section of an energy absorbing material in place.

With regard to materials from which the deformable/energy absorbing material may be formed, it is anticipated that metal foams of open or closed cell structure would be particularly suitable. Such porous materials may incorporate a regular or substantially regular cellular or porous material, or the porous materials may incorporate irregularly cellular or porous materials in which the size/shape/density of cells or pores varies throughout the material structure. Moreover, the variation may be graded or repeated in subsections throughout the material or may be essentially random. In particular, it is anticipated that an aluminium foam manufactured from aluminium powder represents a particularly preferred material. Foams of this kind may employ polymers, such as silicone polymers, cast into the metal foam structure to enhance the crush protection properties of the energy absorbing material. Foams may also be produced containing porous ceramic materials, such as pumice. A further aspect of this invention relates to a method for manufacturing a ceramic-containing metal foam in which molten metal is mixed with particles of a porous ceramic material, the mixture poured into a cavity and pressure applied to avoid separation of the mixture prior to cooling. As a result the ceramic material is included within the cells of the foam regardless of whether the cells are open or closed. It is possible under certain circumstances to carry out the aforementioned method to create a density gradient throughout the final material, for example, by employing gravity to ensure that the bottom of the cast product has a higher density (lower porosity) than the top. Such a graded material may then be employed in applications where the higher density portion of the casting could be presented as a gas contacting surface (e.g. fifth or sixth embodiments in FIGS. 6 and 7) with the lower density (higher porosity) portion of the material residing therebehind. In this way, the gas contacting surface would cause less disruption to gas flow over its surface but could also facilitate efficient gas flow through the material (if desired) and ensure the material is as light as possible.

In place of, or in addition to, using a metal foam, the deformable, energy absorbing material may be formed from or comprise a metal mesh, which may optionally incorporate one or more metals, polymer and/or ceramic cast into the open cells of the metal mesh and/or foam to provide a composite structure. A preferred material is a steel reinforced aluminium metal mesh or foam which provides a good compromise between strength and weight, particularly when replacing a conventional steel compressor diffuser plate, as in the third preferred embodiment of the first aspect of the present invention described above in relation to FIG. 4.

The deformable, energy absorbing material may be produced from any appropriate metal or metal alloy provided it can withstand the operating conditions of the compressor/turbine within which it is being used and provided that it affords the required level of energy absorption. It is envisaged that aluminium metal and aluminium alloy foams are most preferred. Titanium and titanium alloys may be used in place of aluminium-based materials or in combination therewith. Additionally or alternatively, magnesium and magnesium alloys may be incorporated into preferred energy absorbing materials which may also incorporate aluminium and/or titanium based materials. The energy absorbing material may also incorporate iron or steel, such as stainless steel which is particularly preferred in high temperature locations such as in the turbine housing. It is also envisaged that copper or nickel-based alloys, such as Inconel-type materials could be employed as a substitute for steel components or regions of steel components in conventional turbochargers.

In addition to the above, it will be evident to the skilled person that the various aspects of the present invention may employ other types of "crush materials" as have been developed for use in crumple zones of automobiles, provided the materials chosen can withstand the operating conditions of a compressor/turbine.

The invention claimed is:

1. A turbine comprising:
   a housing;
   a turbine wheel supported within said housing for rotation about a turbine axis;
   an annular inlet passage within said housing upstream of said turbine wheel and defined between respective radial inlet surfaces of first and second wall members;
   an axial outlet passage within said housing downstream of said turbine wheel;
   wherein the turbine housing incorporates at least one section comprised of a deformable, energy absorbing material arranged to deform and absorb energy generated as a result of turbine wheel failure;
   wherein the turbine housing comprises at least one hollow wall portion, wherein the deformable, energy absorbing material is within the at least one hollow wall portion to shield the entire deformable, energy absorbing material from gases flowing through the turbine.

2. A turbine according to claim 1, wherein the deformable, energy absorbing material forms at least part of the turbine housing which defines the annular inlet passage, the axial outlet passage or the annular inlet passage and the axial outlet passage of the turbine.

3. A turbocharger comprising a turbine according to claim 1.

4. A turbine according to claim 1, wherein said deformable, energy absorbing material comprises a cellular material.

5. A turbine according to claim 1, wherein said deformable, energy absorbing material comprises an open or closed pore material.

6. A turbine according to claim 1, wherein said deformable, energy absorbing material comprises a metal foam or metal mesh.

7. A turbine according to claim 1, wherein said deformable, energy absorbing material is a metal foam having a density of up to around 50% of the density of a corresponding solid material.

8. A turbine according to claim 1, wherein said deformable, energy absorbing material is a metal foam having a density of around 5 to 25% of the density of a corresponding solid material.

9. A turbine according to claim 1, wherein said deformable, energy absorbing material comprises at least one metal or at least one alloy of said metal selected from the group consisting of aluminum, titanium, magnesium, iron, steel, nickel and copper.

10. A turbine according to claim 1, wherein said deformable, energy absorbing material comprises one of: a composite of two or more metals, a composite of two or more metal alloys, and a composite of at least one metal and at least one metal alloy.

11. A turbine according to claim 10, wherein said composite comprises steel reinforced aluminum.

12. A turbine according to claim 1, wherein said deformable, energy absorbing material incorporates one or more polymeric and/or ceramic materials.

13. A turbocharger comprising:
    a turbocharger shaft rotatable about an axis;
    a turbine comprising a turbine wheel provided at one end of the shaft for rotation about said axis within a turbine housing;
    a compressor comprising an impeller wheel mounted to the other end of the shaft for rotation about said axis within a compressor housing;
    the shaft being rotatable on at least one bearing assembly housed within a bearing housing located between the compressor housing and the turbine housing;
    wherein the compressor housing has at least one section comprised of a deformable, energy absorbing material arranged to deform and absorb energy generated as a result of the failure of the impeller wheel;
    wherein the turbine housing comprises at least one hollow wall portion, and wherein a deformable, energy absorbing material is within the at least one hollow wall portion to shield the entire deformable, energy absorbing material from gases flowing through the turbine, the deformable, energy absorbing material arranged to deform and absorb energy generated as a result of the failure of the turbine wheel.

14. A turbocharger according to claim 13, wherein the turbine comprises:
    an annular inlet passage within said turbine housing upstream of said turbine wheel and defined between respective radial inlet surfaces of first and second wall members;
    an axial outlet passage within said turbine housing downstream of said turbine wheel.

* * * * *